United States Patent [19]
Dunn

[11] 3,853,193
[45] Dec. 10, 1974

[54] VEHICLE DRIVE AND CONTROL SYSTEM
[75] Inventor: Guy A. Dunn, Martinsville, Ind.
[73] Assignee: The Mini-Track Tractor Co., Inc., Martinsville, Ind.
[22] Filed: May 7, 1973
[21] Appl. No.: 358,048

[52] U.S. Cl............... 180/6.48, 60/456, 74/528
[51] Int. Cl........................................ B62d 11/04
[58] Field of Search.............. 180/6.48, 6.7, 6.2; 60/456; 74/528

[56] References Cited
UNITED STATES PATENTS

| | | | |
|---|---|---|---|
| 2,933,142 | 4/1960 | Whaley | 180/6.48 |
| 3,362,161 | 1/1968 | Flint | 60/456 X |
| 3,435,798 | 4/1969 | Rieli | 180/6.48 |
| 3,605,519 | 9/1971 | Heggen | 180/6.48 X |

Primary Examiner—David Schonberg
Assistant Examiner—John A. Pekar
Attorney, Agent, or Firm—Woodard, Weikart, Emhardt & Naughton

[57] ABSTRACT

A track laying tractor has a front mounted engine and rear mounted pair of transmissions and right-angle drive units, each transmission and drive-unit being provided for one of the two tracks. A single engine output shaft provides input for the two transmissions, through gearbelts, and output speed reducing sprockets and chains are employed between the transmissions and gear boxes for the necessary speed reduction. There are two self-centering track control handles, the left-hand handle controlling the left-hand track, and the right-hand handle controlling the right-hand track.

10 Claims, 4 Drawing Figures

PATENTED DEC 10 1974 3,853,193

VEHICLE DRIVE AND CONTROL SYSTEM

BACKGROUND OF THE INVENTION

1. Field of the Invention

This invention relates generally to track-laying tractors, and more particularly to a small sized tractor with precision convenient controls facilitating safe operation.

2. Description of the Prior Art

Of course there are small, track-laying tractors known. Those of which I am aware employ cone clutch arrangements or single transmission units to control the tracks. They have had problems of size, cost, difficulty of maintenance, difficulty of replacement, or combinations of such problems. It is a general object of the present invention to provide an improved tractor drive and control system minimizing or eliminating such problems.

SUMMARY OF THE INVENTION

Described briefly, in a typical embodiment of the present invention, a drive and control system employs separate hydrostatic transmissions and right-angle drive gear boxes to provide power from a common engine output shaft to the left and right-hand tracks, separately and independently. Means are provided for returning the controls to neutral, whenever released by the operator, and the arrangement of the controls, transmissions, and gear boxes is compact and yet readily serviced, if needed.

DESCRIPTION OF THE PREFERRED EMBODIMENT

Figure 1:
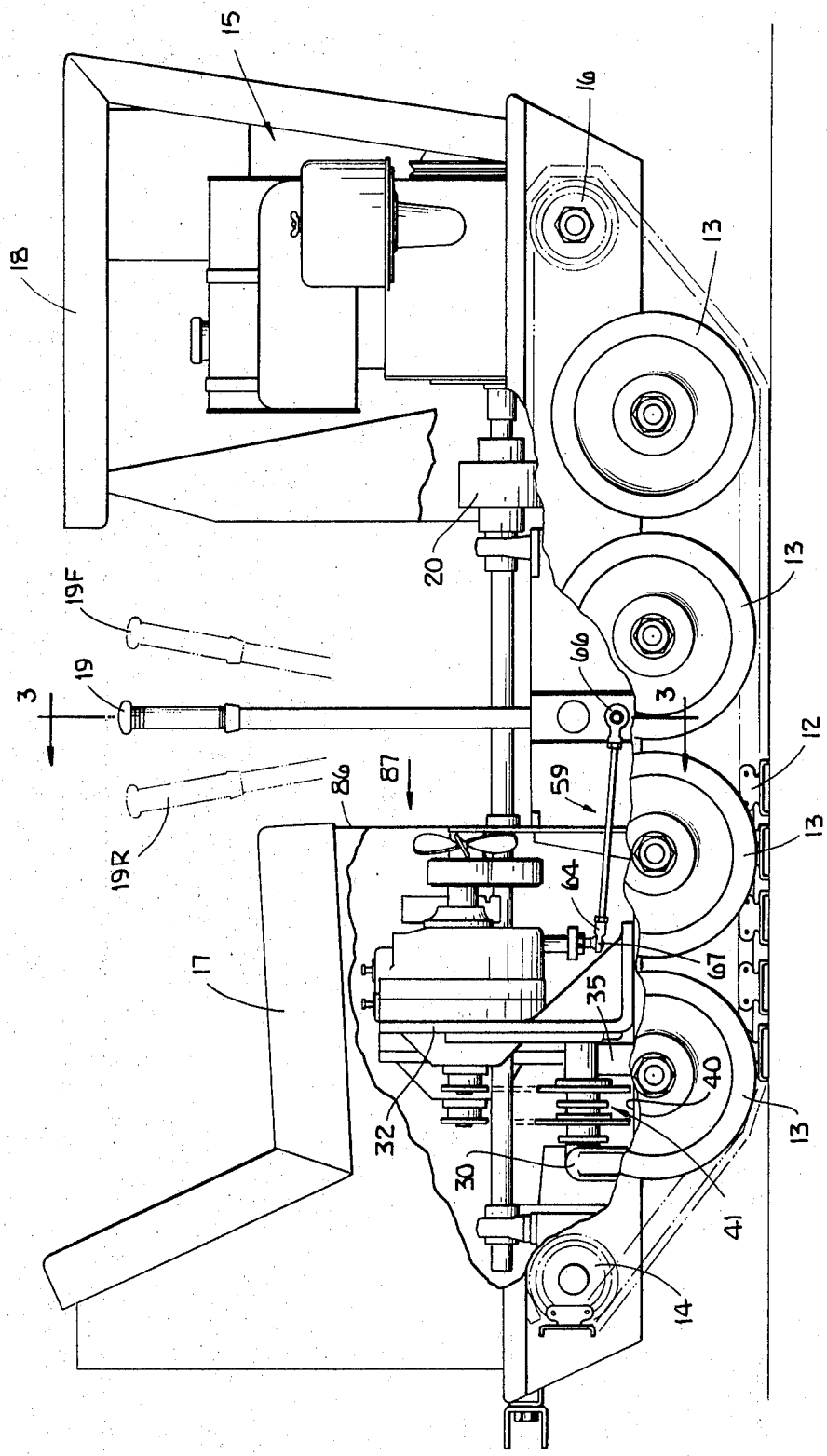
FIG. 1 is a side elevational view of a tracked vehicle, partially cut-away to show interior details, and with some of the links of the right-hand track being shown by solid lines, but the rest being indicated by dashed lines.

Referring now to the drawings in detail, the tractor 11 is supported on two horizontally spaced tracks such as 12, by means of four wheels on each side of the tractor. At the rear, the track runs around the drive sprocket 14, and at the front it runs around an idler sprocket 16, which is spring loaded to maintain tension on the track. Below the seat 17 there are transmissions and right-angle drive units arranged according to this invention, and below the hood 18 there is an engine 15. Two control handles 19 and 21 are provided, to control the right-hand track and the left-hand track, respectively.

Figure 2:
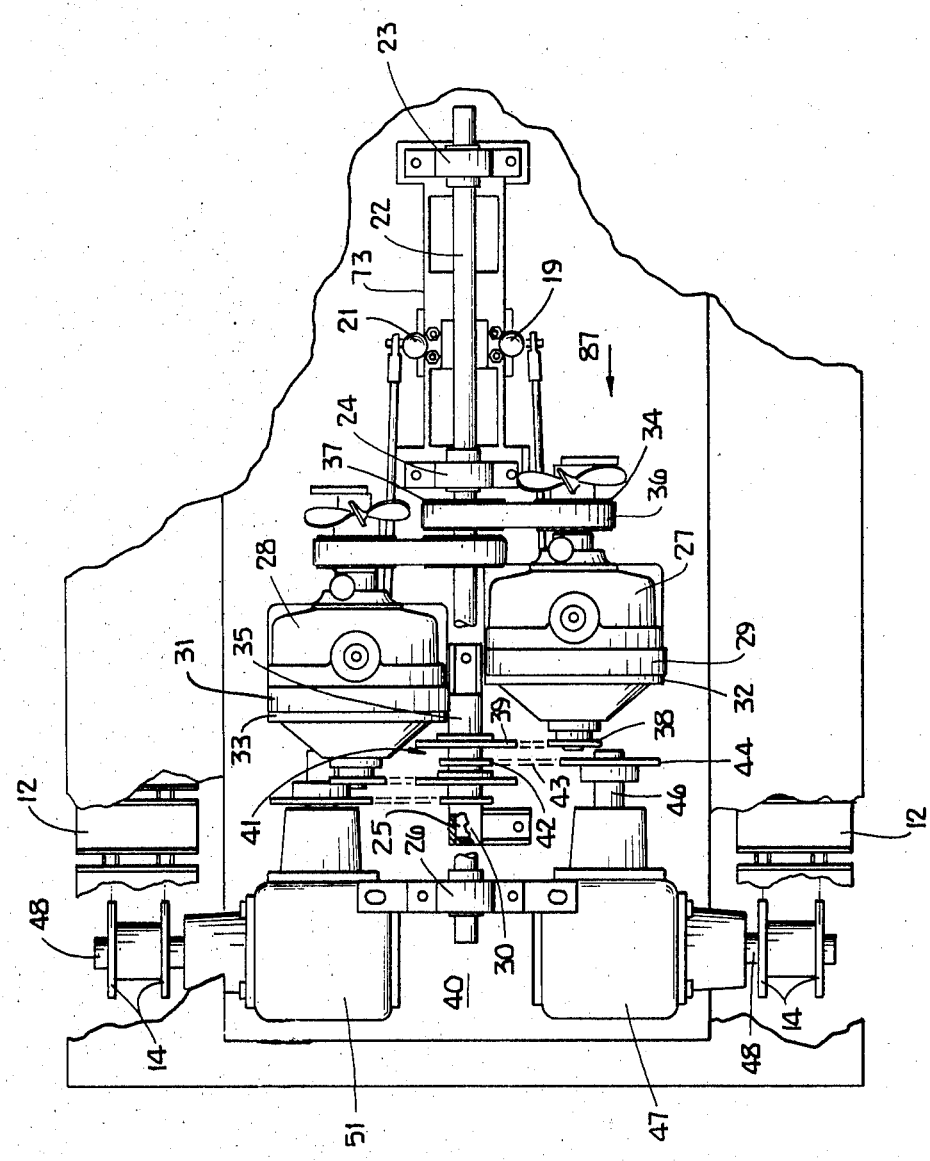
FIG. 2 is a fragmentary top plan view, with portions broken away to show interior details.

Referring more particularly to FIG. 2, an output shaft 22 from the engine is supported in bearings 23, 24 and 26. The front end of this shaft is connected through a universal joint 20 to the crankshaft of the engine.

Two hydrostatic transmissions 27 and 28 are affixed to the vehicle by means of bolting the mounting flanges 29 and 31 respectively thereof to transmission mount castings 32 and 33 respectively, these castings being affixed to the bottom plate 40 of the tractor chassis. A description of one of these transmissions will suffice for both.

Transmission 27 has an input shaft at the front end, to which a gearbelt pulley 34 can be keyed, splined, or affixed by means of a set screw. This pulley is driven by a gearbelt 36 mounted to the gearbelt pulley 37 keyed or splined to the power shaft 22. The other transmission is powered in the same way.

A sprocket 38 is affixed to the output shaft of transmission 27. This is typically a 13 tooth sprocket and is connected by a chain to a 26 tooth sprocket 39 which is part of the cluster-sprocket assembly 41 mounted by means of a bushing on a short, cluster-sprocket support shaft 25, but freely rotatable with respect thereto. The shaft 25 is directly below input shaft 22, and is secured between a pair of brackets 30 and 35 affixed to the tractor chassis bottom plate 40. The cluster-sprocket assembly 41 has a small, 13 tooth output sprocket 42 thereon driving a chain 43 driving a 26 tooth sprocket 44 connected to the input shaft 46 of the right-angle drive unit 47. The output shaft 48 of the drive unit mounts the track drive sprocket 49 which is keyed or splined thereto.

A transmission which has been found suitable for this purpose is the Model 10 hydrostatic transmission marketed by Eaton Corporation, Fluid Power Division, Marshall Plant, 1101 West Hanover Street, Marshall, Mich. 49068. As an example, those employed in the present invention are both identical, and the input shaft rotation is clockwise. The part number is ET-15014-2.

As an example of the right-hand angle drive unit, the Model 66, Hub City right angle bevel gear box, part number 02-21-01795-503, as marketed by the Hub City Division of Safe Guard Industries, Inc., of Aberdeen, S.D. 57401 is suitable for the intended use.

The same kind of arrangement as described for the transmission of power from transmission 27 to the drive unit 47, is employed between the transmission 28 and drive unit 51 for the left track drive pulley which, in the illustrated embodiment, is a sprocket just as it is for the right track drive. It may be noted that the sprocket on the input shaft of the drive unit 51 is located nearer the unit itself than is the sprocket 44 on the drive unit 47, in order to accommodate the end-to-end arrangement of the cluster-sprockets on the cluster-sprocket support shaft 25.

Figure 3:
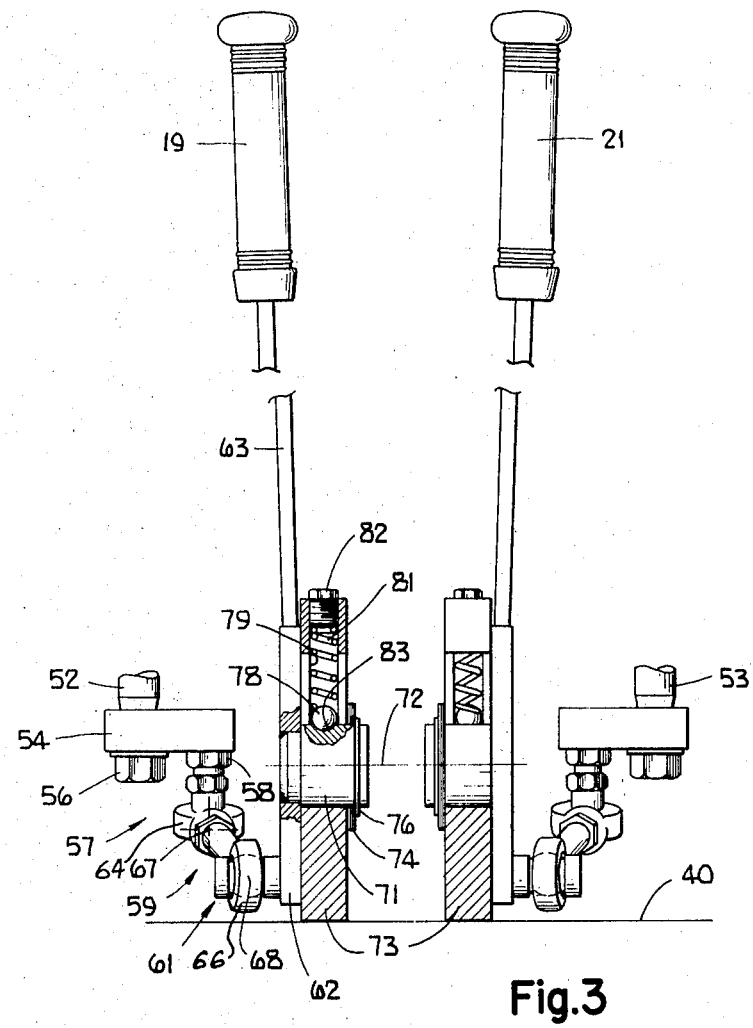
FIG. 3 is a section taken at line 3—3 in FIG. 1 and viewed in the direction of the arrows.

As is best shown in FIG. 3, each of the transmissions is provided with a control shaft, extending downward from the bottom. Shaft 52 is provided on transmission 27, and shaft 53 is provided on transmission 28. The linkage from control handle 19 to control shaft 52 will be described and, as it is essentially the same for control handle 21 and control shaft 53, the latter will not be described.

A right-hand control lever 54 is mounted on the tapered surface of control shaft 52, keyed thereon, and secured in place by the nut and lock washer assembly 56. A ball swivel unit 57 is threadedly received in the arm 54 inboard of the control shaft 52 and secured in place by the jam nut 58. A link 59 is connected between this swivel post and a swivel post 61 threadedly received and thereby affixed in the lower end portion 62 of the control lever arm 63 to which the handle 19 is mounted at the top. The linkage member 59 has a socket 64 at the transmission end, and a socket 66 at the control lever, and each of these sockets is threadedly received on the linkage rod itself for linear adjustment with respect thereto and to thereby provide the desired distance between the center 67 of the pivot point at the lever ball, and the center 68 at the pivot point of the hand lever ball. Jam nuts are provided on the socket units to lock them in place once the desired adjustment has been obtained.

The arm 63 has affixed thereto a journal 71 rotatably mounted on a horizontal axis 72 in a drive shaft mounting bracket 73 affixed to the bottom plate 40 of the tractor chassis. Suitable shims 74 are provided and a snap ring 76 retains the journal in its mounting.

Another feature of the invention is a self-centering spring loaded detent ball 78 received in a bore 79 in the bracket 73 and urged downwardly by a spring 81. The spring is loaded by a cap screw 82 which is threadedly received in the bracket 73.

Figure 4:
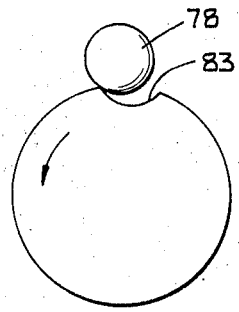
FIG. 4 is a view along the axis of the control handle, and showing the operation of the detent ball.

This ball is received in a hemispherical socket 83 and, as best shown in FIG. 4, will ride up toward the edge of the socket 83 as the lever is moved from the neutral position shown in the solid outline in FIG. 1, to either the full forward, or full reverse positions shown respectively by the dotted lines 19F and 19R in FIG. 1. Therefore, once the operator releases the handle, it will be returned to the neutral position by the urging of the ball against the wall of the socket or cup 83, returning it to neutral. When the lever is in the neutral position, the transmission control lever 54 is in the neutral position, and it is the nature of the transmissions employed according to this invention, that the output shaft thereof is thereupon locked. Thus when the lever 54 is in the neutral position, the output sprocket 38 of transmission 27 cannot turn. So it is seen that, if the operator should happen to release both handles, both tracks stop and the vehicle cannot be moved. This is an important safety feature.

For cooling the transmissions, fans are provided on the transmission input shafts immediately under the seat behind the front seat-support wall 86 to provide a movement of air in the direction of arrow 87 at all times that the engine is running, regardless of whether or not the vehicle is running. This flow of air also tends to cool the feet of the operator which are normally disposed on either side of the input or drive shaft bracket 73.

While the invention has been disclosed and described in some detail in the drawings and foregoing description, they are to be considered as illustrative and not restrictive in character, as other modifications may readily suggest themselves to persons skilled in this art and within the broad scope of the invention. For example, speed ratios other than the preferred two to one ratios, can be employed by using different sprocket or gearbelt pulley sizes and tooth numbers, and by using different right-angle gear box reductions from the two-to-one reduction in the above described gear boxes. For some overall ratios, it may be possible to eliminate the jackshaft 25 and clusters thereon.

I claim:

1. A tracked vehicle drive system comprising:
   a power input shaft coupled to an engine and receiving energy therefrom;
   first and second hydrostatic transmissions on opposite sides of said input shaft, each of said transmissions having an input member and an output member;
   pulley and drive belt means in front of said transmissions and coupling said input shaft to said input members to apply power from the engine to said transmissions;
   first and second right-angle drive gear boxes, said first gear box being behind said first transmission, and said second gear box being behind said second transmission; each gear box having an input member and an output member;
   the output members of said hydrostatic transmissions and the input members of said gear boxes being substantially parallel;
   first and second vehicle track drive pulleys connected to the output members of said first and second gear boxes, respectively;
   and power transmitting pulley and drive belt means between said transmissions and said gear boxes and drivingly coupling the input members of said first and second gear boxes to the output members of said first and second transmissions, respectively, whereby said first transmission is enabled to drive said first track drive pulley, and said second transmission is enabled to drive said second track drive pulley independent of said first track drive pulley.

2. The drive system of claim 1 and further comprising:
   fans connected to the input members of the transmissions and oriented to blow air on said transmissions as the input members are driven by the input shaft.

3. The drive system of claim 1 and further comprising:
   first and second transmission control levers ahead of said transmissions, and coupled to said first and second transmissions, respectively, for control of said transmissions.

4. The drive system of claim 3 and further comprising:
   a vehicle chassis;
   a driver's seat mounted to said chassis over said transmissions and gear boxes, and behind said control levers, said levers being in generally upstanding position and side-by-side.

5. The drive system of claim 4 wherein each of said levers has a horizontally disposed journal, the journal being pivotally mounted in the vehicle chassis to pivot about a horizontal axis.

6. The system of claim 5 and further comprising:
   a first adjustable spring loaded detent ball in said chassis;
   a detent cup in the journal of said first lever and receiving said ball therein to hold said first lever in a neutral position,
   the coupling of the first lever to the first transmission being such that a forward limit position of the lever places the transmission in forward drive condition, and a rearward limit position of the lever places the transmission in rearward drive condition, the detent cup and ball being sized such that the ball remains partially in the cup when the lever is in the forward limit position and in the rearward limit position, to exert centering force by cam action of the ball on the edge of the cup to return the lever to neutral when manual external force is removed from the lever.

7. The system of claim 6 wherein:

the transmissions are such as to have locked output members when the control levers therefor are in neutral position.

8. The system of claim 1 wherein the said power transmitting pulley and drive means between the transmissions and gear boxes include:

first and second cluster sprockets mounted on a cluster mounting shaft below said input shaft and freely rotatable with respect to said mounting shaft, the first cluster sprocket including a first sprocket;

a first chain connected to the first sprocket and to a first transmission output sprocket and providing a two to one speed ratio between the output member of the first transmission and the first cluster sprocket;

a first gear box input sprocket and located on the input member of a first gear box;

a second sprocket on the first cluster sprocket; and a second chain connected to the second sprocket and to the first gear box input sprocket and providing a two to one speed ratio between the first cluster sprocket and the first gear box input sprocket.

9. The system of claim 8 wherein the second cluster sprocket includes third and fourth sprockets, the pulley and drive means between the transmission and gear boxes further including;

a third chain connected to the third sprocket and to a second transmission output sprocket and providing a two to one speed ratio between the output member of the second transmission and the second cluster sprocket;

a second gear box input sprocket and located on the input member of the second gear box;

and a fourth chain connected to the fourth sprocket and to the second gear box input sprocket and providing a two to one speed ratio between the second cluster sprocket and the second gear box input sprocket.

10. The system of claim 9 wherein:

the input shaft is above the cluster, and cluster sprockets are at a level below the transmissions and gear boxes.

* * * * *